(12) United States Patent
Woodmansee et al.

(10) Patent No.: US 6,478,565 B2
(45) Date of Patent: Nov. 12, 2002

(54) TOUCH SENSING APPARATUS

(75) Inventors: Donald Ernest Woodmansee; Ram Kumar Upadhyay, both of Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/850,638

(22) Filed: May 7, 2001

(65) Prior Publication Data

US 2001/0022406 A1 Sep. 20, 2001

Related U.S. Application Data

(63) Continuation of application No. 09/192,427, filed on Nov. 16, 1998, now Pat. No. 6,294,113.

(51) Int. Cl.$^7$ ............................................. B29C 43/58
(52) U.S. Cl. ........................ 425/149; 264/40.5; 425/150
(58) Field of Search ................. 425/135, 149, 425/150, 140, 141; 264/40.1, 40.4, 40.5, 40.7, 316, 324, 320

(56) References Cited

U.S. PATENT DOCUMENTS

| 4,502,857 | A | * | 3/1985 | Hinks | 425/144 |
| 5,043,111 | A | * | 8/1991 | Hinzmann et al. | 425/149 |
| 5,174,933 | A | * | 12/1992 | Toh et al. | 425/149 |
| 5,528,452 | A | * | 6/1996 | Ko | 361/283.4 |
| 6,294,113 | B1 | * | 9/2001 | Woodmansee et al. | 425/149 |

* cited by examiner

*Primary Examiner*—Tim Heitbrink
(74) *Attorney, Agent, or Firm*—Patrick K. Patnode; Christian G. Cabou

(57) ABSTRACT

An apparatus and method for sensing touch between a compression mold and a workpiece located in the compression mold including a mold cavity and a mold closure movable relative to the workpiece. The apparatus may include at least one touch sensor pad positionable to signal touch between the mold closure and the workpiece. The touch sensor pad may be in communication with a touch sensor monitor for indicating touch between the workpiece and the mold closure. The touch sensor pad may also be embodied in a touch sensor assembly.

8 Claims, 6 Drawing Sheets

TOUCH SENSING APPARATUS

This application is a continuation of application Ser. No. 09/192,427, filed Nov. 16, 1998 now U.S. Pat. No. 6,294,113 which is hereby incorporated by reference in its entirety.

BACKGROUND OF THE INVENTION

This invention relates to a touch sensor, and more specifically, to enhancing contact or pressure between a mold closure and a workpiece to prevent lateral movement of the workpiece during compression molding.

Typically, a multilayered workpiece is formed layer by layer, where individual layers can vary by at least 5–10% in thickness. The workpiece is then debulked by applying a vacuum and heat to remove gas and pre-densify the workpiece. Finally, the workpiece is placed in a sealed bag in a mold and further densified into a final formed workpiece using only autoclave air pressure. Compression molding a debulked workpiece, however, has been found to provide better exterior surface geometry than conventional autoclave molding, as well as forcing the workpiece to a final geometry which is less dependent on material layer variability.

In a compression molding process, the preformed workpiece is assembled similar to the autoclave process. Instead of autoclave molding the workpiece for final densification, however, the debulked workpiece is placed in a compression mold cavity and a mold closure moves into contact with the workpiece while the mold is also heated according to a pre-determined temperature schedule. Final densification of the workpiece is performed by compressing the workpiece between the mold cavity and the mold closure within the mold.

Unfortunately, the act of obtaining better exterior surface geometry through compression molding may, in some cases, lead to the generation of excessive lateral flow of one or more layers of the workpiece. The excessive lateral flow may tend to form wrinkles in the one or more layers. Such wrinkles create an abnormality in the workpiece and in some cases may lead to a derating of the strength of the final formed workpiece.

One cause for the excessive lateral flow is believed to be non-uniform contact between the mold and the workpiece, particularly upon initial contact of the mold with the workpiece before compression molding commences. Another cause is believed to be non-uniform pressure applied to the workpiece during compression molding. Consequently, it is desirable to assure that the mold contacts the preformed workpiece as completely and uniformly as possible before and during compression molding to reduce the likelihood of excessive lateral motion of the workpiece relative to the mold. For a similar reason, it is desirable to assure that the pressure applied upon the preformed workpiece during compression molding is tailored to get a high quality part.

Accordingly, there is a need in the art for an improved mold closure.

SUMMARY OF THE INVENTION

An apparatus and method is disclosed for sensing touch between a compression mold and a workpiece located in the compression mold including a mold cavity and a mold closure movable relative to the workpiece. The apparatus may include at least one touch sensor pad positionable to signal touch between the mold closure and the workpiece. The touch sensor pad may be in communication with a touch sensor monitor for indicating touch between the workpiece and the mold closure. The touch sensor pad may also be embodied in a touch sensor assembly.

DETAILED DESCRIPTION OF THE PREFERRED EMBODIMENT

Figure 1:
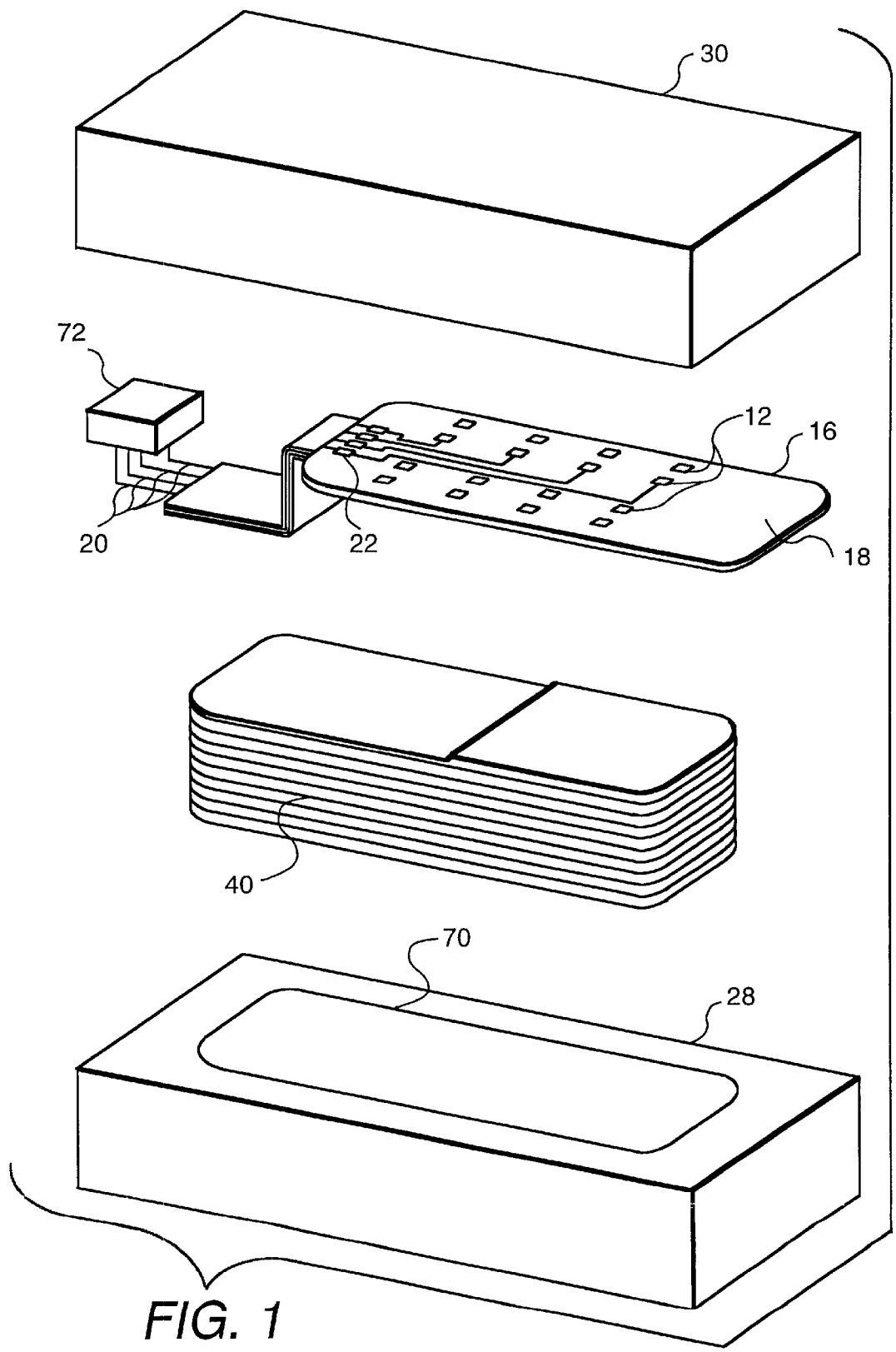
FIG. 1 is a diagrammatic exploded cross-sectional side view of a mold closure, a workpiece, a mold cavity and a touch sensor, where the mold closure is moved into contact with the workpiece.
Figure 2:
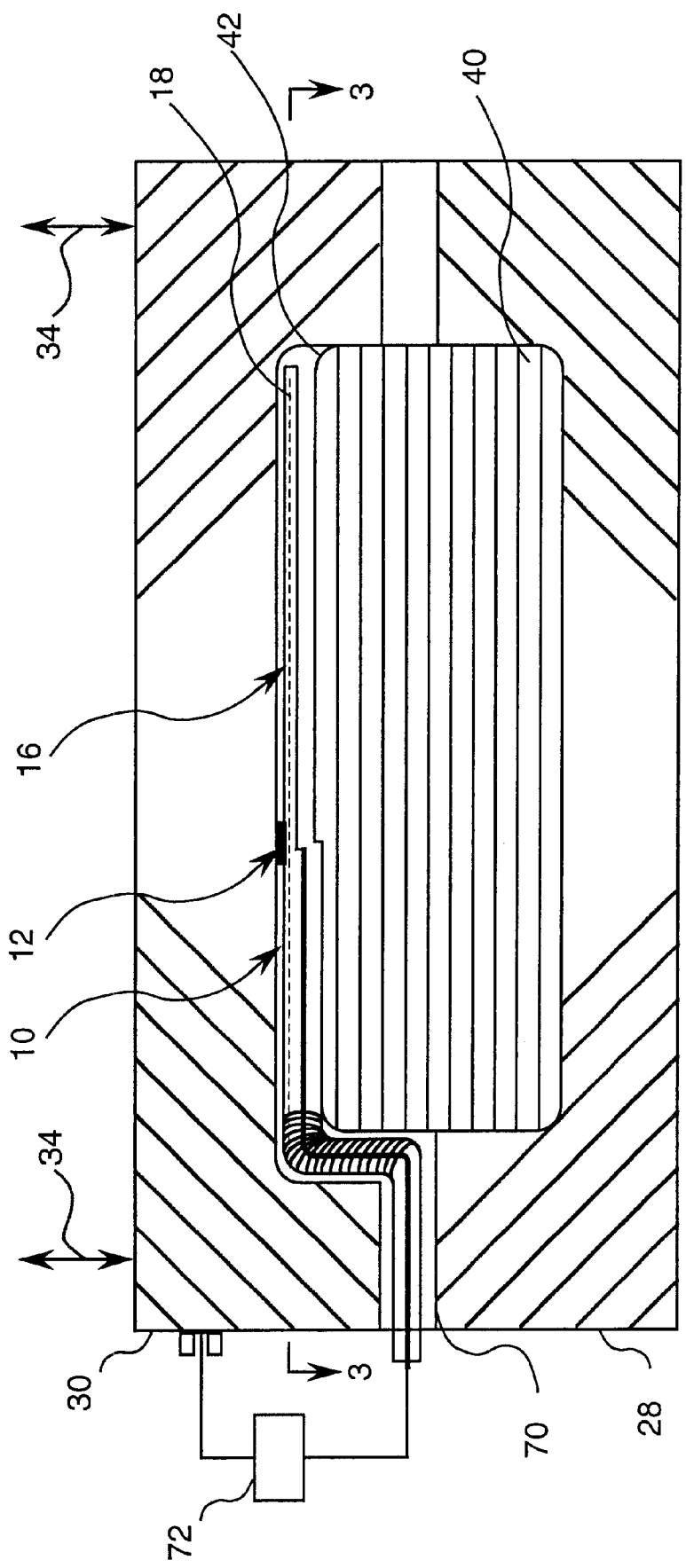
FIG. 2 is a non-exploded view of FIG. 1.
Figure 3:
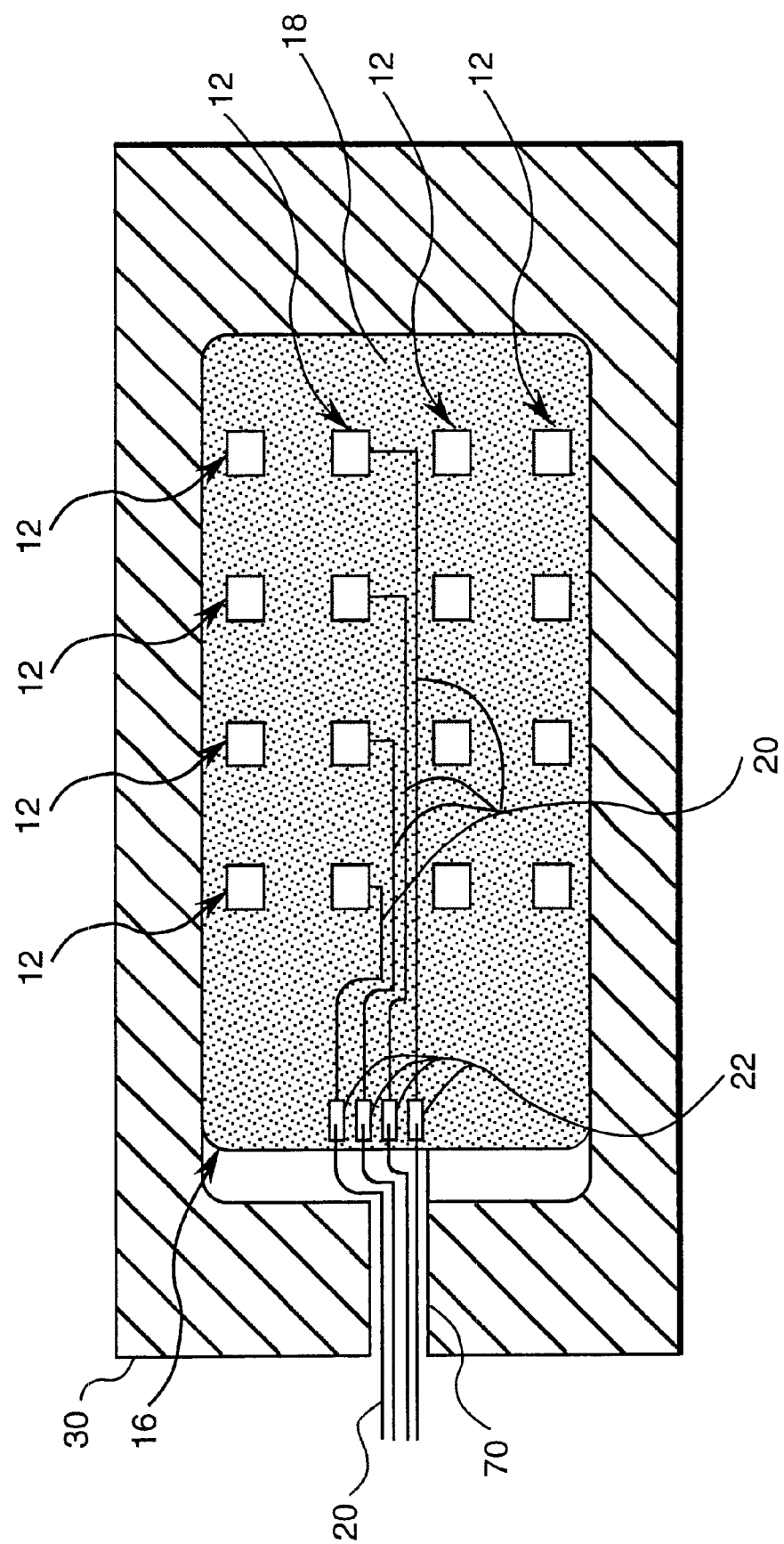
FIG. 3 is a diagrammatic partial plan view along the line 3—3 of FIG. 2, but including a plurality of touch sensors.

FIGS. 1–3 diagrammatically illustrate an apparatus 10 for sensing touch between a mold 26, for example, a compression mold, and a workpiece 40, typically composed of multiple layers of material. Mold 26 may comprise any conventional compression molding machine that includes a compression mold closure 30, a compression mold cavity 28 and a mold aperture 70 leading from inside mold cavity 28 to an outside environment. In one embodiment, mold 26 comprises a four-piston hydraulic type of compression mold machine, for example, a Murdock™ compression mold machine.

Workpiece 40 can be positioned in mold cavity 28, which mold cavity 28 is preferably substantially fixed relative to workpiece 40, and thereby workpiece 40 is movable relative to mold closure 30. At least one touch sensor, such as touch sensor pad 12, is positionable to signal how mold closure 30.touches workpiece 40. The term touch is used herein to include any force or effect from mold 26 on workpiece 40 or vice versa. Such touch could range from direct physical touch between opposing surfaces of each to touch between opposing surfaces of each via at least one intermediary means. Also, such touch could range from mere contact, as contact is defined herein, to pressure, as pressure is defined herein, between opposing surfaces of workpiece 40 and mold 26.

Figure 5:
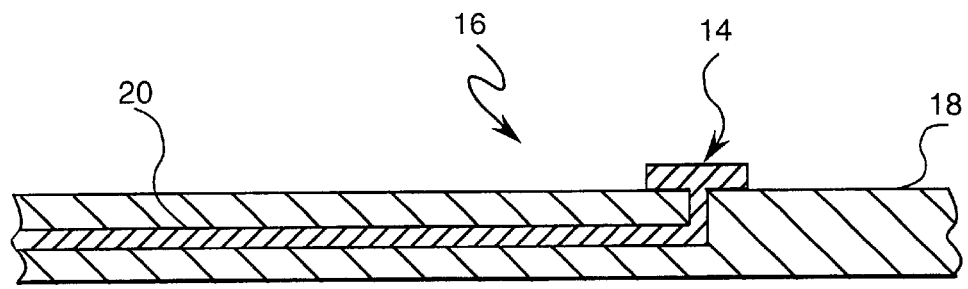
FIG. 5 is a diagrammatic cross-sectional side view of a portion of a contact type touch sensor pad.

Referring to FIG. 5, preferably touch sensor 12 typically comprises at least a contact sensor, such as a contact type touch sensor pad 14. Pad 14 can generate a signal that indicates when compression mold closures 30 contacts workpiece 40 as mold closure 30 is moved into position towards workpiece 40 and mold cavity 28 (FIG. 2). The term contact is used herein to include any contact between mold closure 30 and workpiece 40 ranging from direct physical contact between opposing surfaces of each to contact between opposing surfaces of each via at least one intermediary means. Although contact can be indicated at any time with this invention, it is most useful to know when initial contact is made between mold closure 30 and workpiece 40. For example, the time of this initial contact can be usefully employed as "time-zero" to begin a two step controlled process of (1) closing mold 26 and (2) starting the mold heating. Each step preferably has its own baseline schedule of closure (or preferred force exerted upon workpiece 40) and heat applications, respectively, from then on through completion of the molding process. Subsequent contacts across the surface of workpiece 40, however, can also be used to modify these baseline schedules during the molding process.

Figure 7:
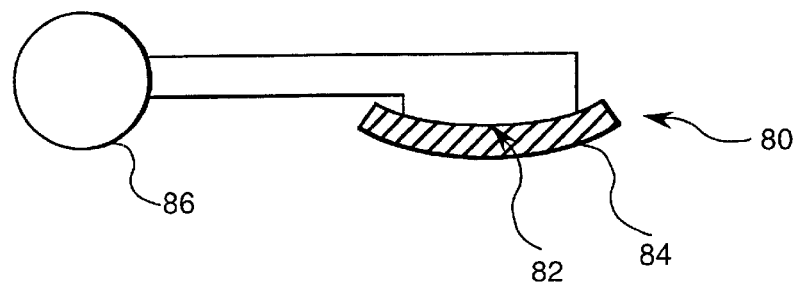
FIG. 7 is a diagrammatic cross-sectional side view of a portion of a strain gauge type of pressure touch sensor pad.

Referring to FIG. 7, additionally or alternatively, touch sensor 12 may comprise a pressure sensor, such as a pressure type touch sensor pad 84. The pressure sensor can provide a signal that indicates a surface pressure between workpiece 40 and compression mold closure 30 adjacent sensor 12, for example, local surface pressure. The term pressure is used herein to include any pressure between mold closure 30 and workpiece 40 ranging from direct physical pressure between opposing surfaces of each to pressure between opposing surfaces of each via at least one intermediary means. Although pressure can be indicated at any time with this invention, it is most useful to know what the local workpiece surface pressure is throughout compression molding after initial contact between the mold closure and the workpiece.

Referring to FIG. 3, at least one sensor 12 preferably comprises a plurality of sensors 12 disposed to signal touch between mold closure 30 and workpiece 40 at a plurality of different points across a surface 42 of workpiece 40. As desired, each sensor 12 may include a contact sensor or pressure sensor, or both. Further, referring to FIG. 2, it is preferred that mold closure 30 tilt relative to workpiece 40 to increase a total number of the plurality of different points signaling touch between mold closure 30 and workpiece 40. Tilting may be achieved through manipulation of mold closure 30 by manual or automatic means. Preferably, tilting is enabled in opposing directions 34 along at least one diameter of mold 26 and most preferably along multiple diameters of mold 26.

Figure 4:
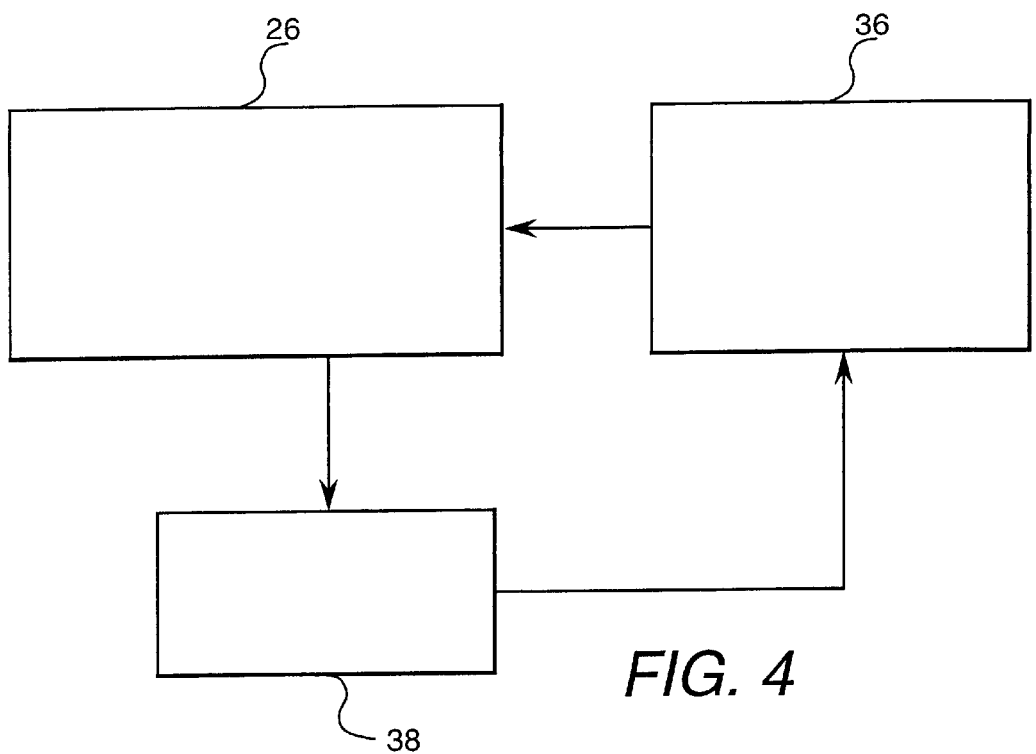
FIG. 4 is a schematic diagram of a compression mold, a compression mold control system and a touch sensor monitor.

FIG. 4 schematically depicts compression mold 26, a compression mold control system 36 and a touch sensor monitor 38. Each communicate with one another to operate mold 26 and monitor and interpret how mold closure 30 is in touch with workpiece 40. For example, manual or automatic means may be utilized to monitor touch between workpiece 40 and mold closure 30 and also to interpret the signal towards controlling movement of mold closure 30 based on the interpreted signal.

FIG. 5 diagrammatically illustrates contact type touch sensor pad 14, which pad 14 is positionable between mold closure 30 and workpiece 40. Contact type touch sensor pad 14 may comprise a touch sensor assembly 16 including a compliant sheet material 18 and contact type touch sensor pad 14. For example, excellent results are contemplated when contact type touch sensor pad 14 comprises a membrane switch used, for example, in appliance user interfaces. Such a low pressure sensor pad (e.g., preferably <1 psi), gives a positive signal on contact with a very small deflection and can bear very high loads (i.e., while the contacts are closed). Further, excellent results are contemplated when, for example, compliant sheet 18 comprises a non-conductive deformable member from the group consisting of resin, thermoplastic resin and silicone rubber, such as GE Lexan™ polycarbonate, GE Ultrin™ polyetherimide or DuPont Kevlar™ resins.

Still referring to FIG. 5, in touch sensor assembly 16 each contact type touch sensor pad 14 (generally indicated by pads 12 in FIG. 3) may be connected to a signal run 20 to provide communication from pad 14 to outside of mold 26. For example, metal contact type touch sensor pads 14 and metal signal runs (e.g., wires) 20 may be utilized for signaling contact with a metal mold closure 30. In such a case, at least one conventional touch sensor monitor, for example, an Ohm meter 72 (FIG. 2), may be connected to signal runs 20 outside of mold 26. This may include use of a wire connector junction 22 (FIG. 3) or signal runs 20 may extend continuously uninterrupted from pads 14 to outside of mold 26. In either case, signal runs 20 exit mold interior through mold aperture 70, or the like, including any of several conventional seal structures such as elastomeric seals or fast cure seals that can be broken off signal runs 20 when compression molding is completed.

In particular, when metal mold closure 30 comes in contact with contact type touch sensor pads 14 (e.g., touch sensor pads 12 of FIG. 2 comprising contact type touch sensor pads), pads 14 signal contact at one or more points across surface 42 of workpiece 40. That is, signal runs 20 may be sequentially connected to a low, DC voltage source whose other terminal would be connected to metal mold closure 30. As mold closure 30 moves toward workpiece 40, at least one, and then others and preferably all, contact type touch sensor pad 14 closes the circuit in a simple continuity check arrangement. This information could be interpreted, by conventional means, to determine which contact type touch sensor pad(s) 14 contact mold closure 30. This information may in turn thereby provide direction to a manual operator or automatic control system as to how to tilt mold closure 30 to enhance a touch result, for example, contact, between mold closure 30 and workpiece 40.

Figure 6:
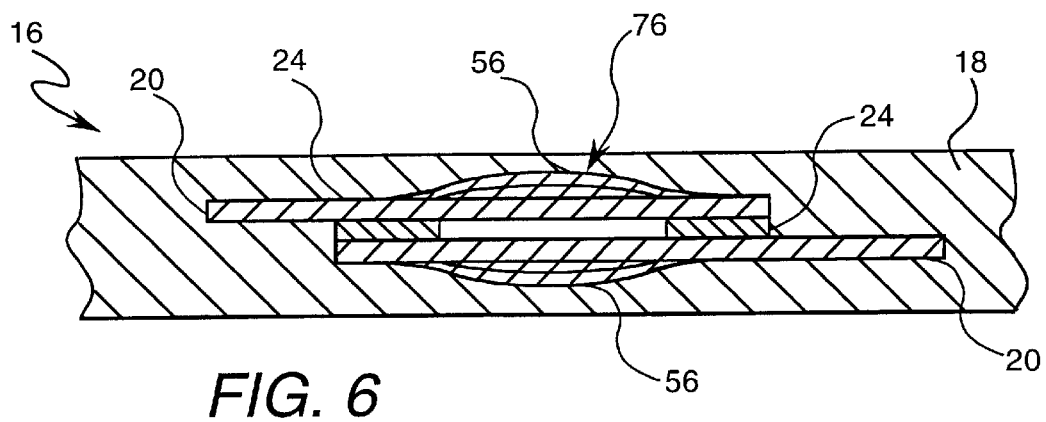
FIG. 6 is a view similar to FIG. 5 but of an alternative embodiment of this invention.

FIG. 6 diagrammatically illustrates an alternative embodiment of a contact type touch sensor pad 76 and touch sensor assembly 16 of this invention. In this embodiment the sensor can be completely encapsulated within compliant sheet material 18. Contact type touch sensor pad 76 can be formed by two opposing surfaces of signal run 20 (for example, a wire) spaced from each other by an insulator 24. Such a contact type touch sensor pad 76 may further include a pair of nubs 56 wherein outside pressure applied to nubs 56 presses them inward toward each other and when their opposing surfaces contact, a circuit is completed, including wire run 20. Also, this embodiment need not be compatible with mold closure 30 (i.e., metal to metal, etc.) because contact type touch sensor pad 76 is wholly contained within compliant sheet material 18. Thus, this embodiment may merely depend on signal communication through contact type touch sensor pad 76 and signal run 20. Other than these structural distinctions, this embodiment is similar to contact type touch sensor pad 14.

FIG. 7 diagrammatically illustrates a strain gauge pressure type touch sensor which is positionable between mold closure 30 and workpiece 40. This pressure type touch sensor may also comprise touch sensor assembly 16 including compliant sheet material 18 and a pressure type touch sensor pad 80 or contact type touch sensor pad(s) 14 or 76, and preferably both. Such a pressure sensor (e.g., preferably sensitive at 10 psi to 1000 psi), more accurately measures local surface pressure between workpiece 40 and mold closure 30 throughout compression molding of workpiece 40. Touch sensor of this invention may comprise a single structure having the features and pressure ranges desired for both contact type and pressure type touch sensors of the invention.

Still referring to FIG. 7, for example, excellent results are contemplated when the pressure type touch sensor comprises a flat strain gauge pad 80. Pad 80 may include a resistor 82 mounted on a deflectable bar or disc substrate 84. In use, bending substrate 84 changes the resistance measured by a resistance monitor 86, and this measurement can be used to determine pressure differentials.

Figure 8:
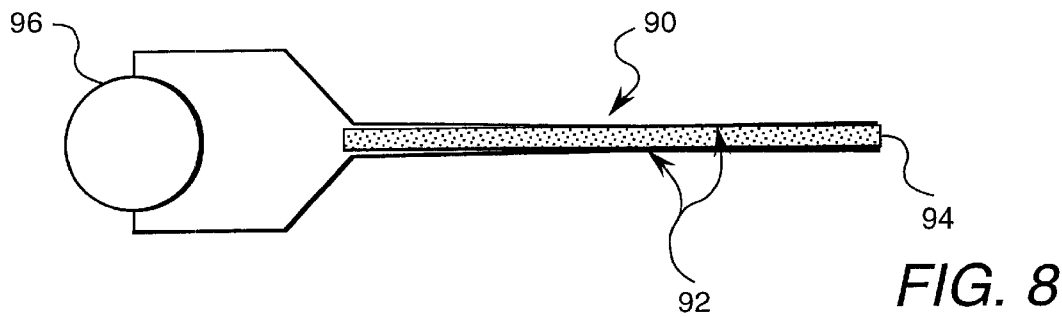
FIG. 8 is a view similar to FIG. 7 but of an alternative embodiment of this invention comprising a piezoelectric type of pressure touch sensor pad.

FIG. 8 diagrammatically illustrates another embodiment of a pressure type touch sensor pad 90, which, aside from its particular function, is interchangeable with the strain gauge type sensor (FIG. 7). Sensor pad 90 may comprise a piezoelectric sensor pad. The sensor may include electrodes 92 plated on piezoelectric material 94. In use, changes in external pressure change the voltage measured by a conventional voltage monitor 96, and this measurement can be used to determine pressure differentials.

Figure 9:
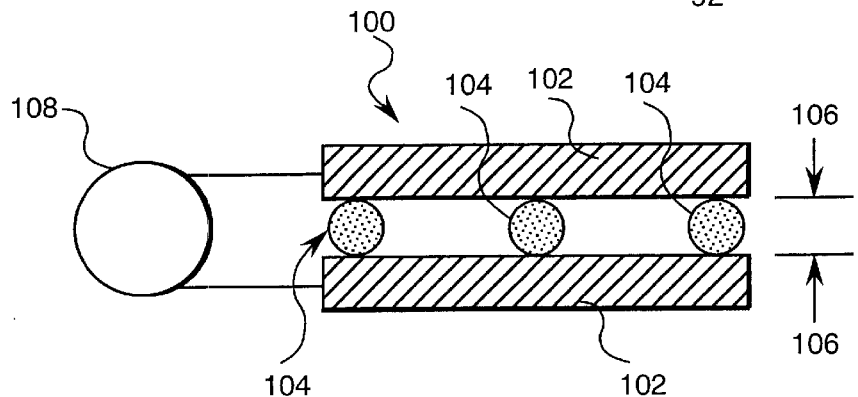
FIG. 9 is a view similar to FIG. 7 but of another alternative embodiment of this invention comprising a capacitive type of pressure touch sensor pad.

FIG. 9 diagrammatically illustrates another embodiment of a pressure type touch sensor pad which, aside from its particular function, is interchangeable with the strain gauge type sensor (FIG. 7). Sensor pad 100 illustrates a conventional capacitive sensor pad. The sensor may include deformable material 104 between stiff conductors 102. In use, a gap 106–106 reduces under loading and system capacitance increases, as measured by a capacitance monitor 108, and this measurement can be used to determine pressure differentials.

Figure 10:
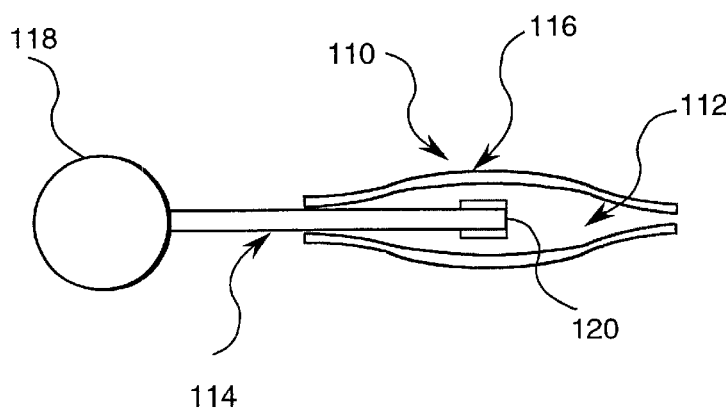
FIG. 10 is a view similar to FIG. 7 but of yet another alternative embodiment of this invention comprising a fiber optic type of pressure touch sensor pad.

FIG. 10 diagrammatically illustrates another embodiment of a pressure type touch sensor pad 110 which, aside from its particular function, is interchangeable with the strain gauge type sensor (FIG. 7). Sensor pad 110 illustrates a fiber optic sensor pad. The sensor may include a fiber optic sensor 114, with a phosphor coated tip 120, surrounded by a gel 112 (e.g., silicone rubber) in a pressure-tight elastomeric bag 116. In use, changes in external pressure change the gel pressure on phosphor tip 120 and fluorescent decay time as a function of pressure is measured by a monitor 118. This measurement can be used to determine pressure differentials. For example, a Ruxtron CO.™ or Panametrics Co.™ fiber optic pressure type touch sensor pad is contemplated to produce excellent results.

Figure 11:
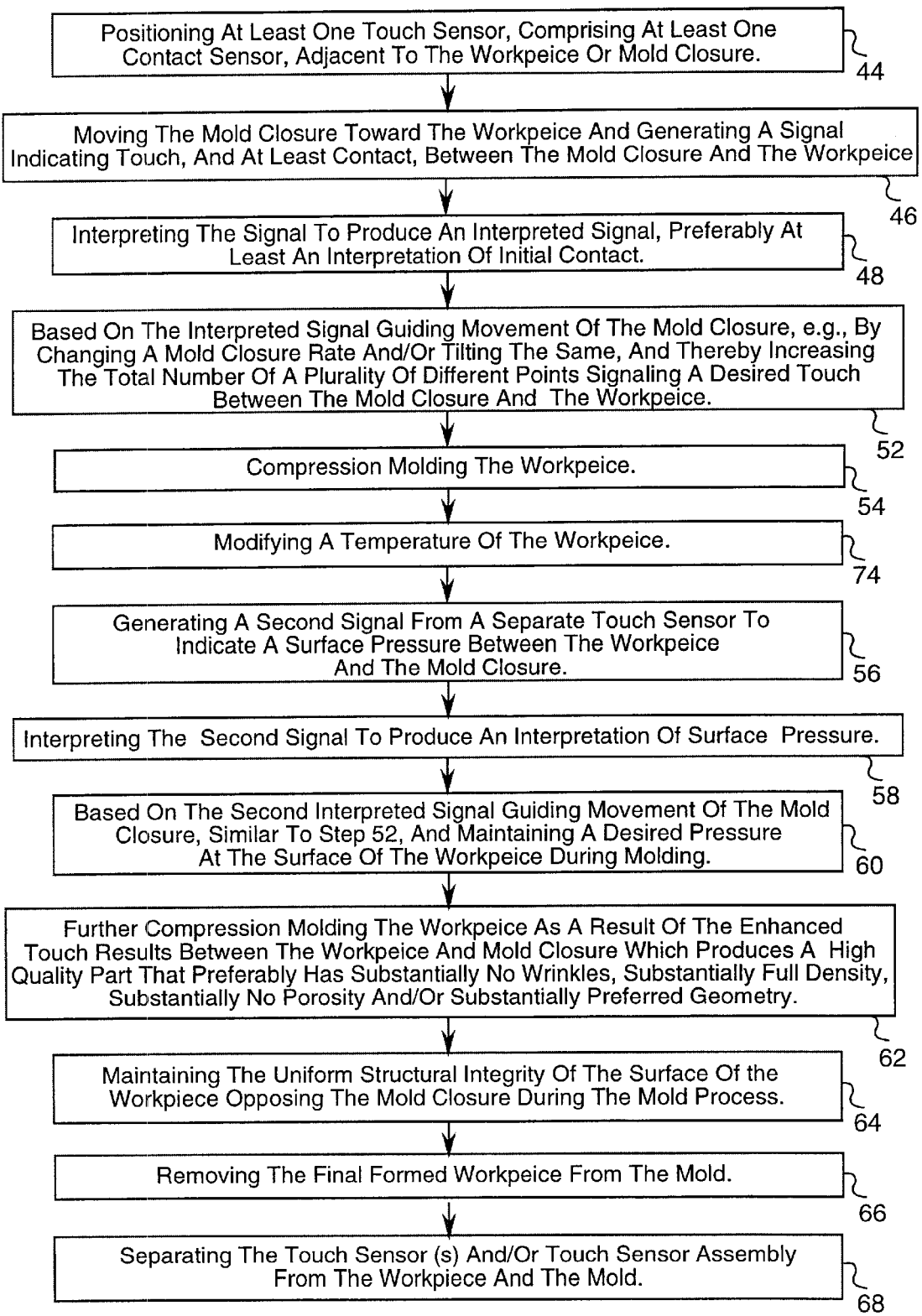
FIG. 11 is a flow diagram depicting steps for practicing the invention.

FIG. 11 depicts a flow diagram for practicing the invention. For example, after a preformed workpiece 40 is debulked and placed in the mold cavity 28 opposing the mold closure 30, at least one touch sensor 12, and preferably a plurality of contact type and pressure type touch sensors, are positioned adjacent to workpiece 40 or mold closure 30, at step 44. Next, mold closure 30 and workpiece 40 are moved, preferably slowly, relative to one another (either or both moving, but preferably only mold closure 30 moving) and a signal is generated indicating how mold closure 30 touches workpiece 40, at step 46. As used herein, the signal may comprise a single signal or multiple signals, either or both being associated with a single touch sensor 12 or multiple touch sensors 12 depending on the intended use.

The step 46 signal is then interpreted to produce an interpreted signal, by conventional means that may be manual or automatic as discussed above, at step 48. Depending on the interpreted signal (e.g., indicating contact at one or more points across workpiece 40 surface), the movement of mold closure 30 is conventionally guided, manually or automatically as discussed above, by changing a rate of closure or tilting the same. Preferably, the interpreted signal and guided movement are utilized towards enhancing a touch result between workpiece 40 and mold closure 30, for example, such as increasing the total number of the plurality of different points signaling contact between mold closure 30 and workpiece 40, at step 52.

Alternatively, or additionally, workpiece 40 may then be compression molded, at step 54. Preferably, this may include substantially preventing lateral movement of workpiece 40, namely the individual layers or material thereof, during compression molding. This may also include modifying the temperature of workpiece 40, by conventional means, according to a desired temperature schedule as discussed previously, at step 74. For example, in addition to enhancing contact between workpiece 40 and mold closure 30 during compression molding, the signal from step 46, or a second signal generated from touch sensor 12, may indicate a local surface pressure between workpiece 12 and mold closure 30, at step 56, which may also depend on the temperature of workpiece 40.

The signal or second signal is then interpreted to produce a second interpreted signal, by conventional means that may be manual or automatic as discussed above, at step 58. Depending on the second interpreted signal (e.g., indicating contact at one or more points across the workpiece surface indicating what the local pressure is at a surface of workpiece 40), the movement of mold closure 30 is further conventionally guided, manually or automatically as discussed above, by further changing the rate of closure or tilting the same as done previously, at step 60. That is, preferably compression molding comprises compression molding workpiece 40 into a high quality part as a result of the enhanced touch results between workpiece 40 and mold closure 30, i.e., substantially no wrinkles, substantially full density, substantially no porosity and preferred geometric specifications, at step 62. In this way, the touch result desired, e.g., maximizing contact between workpiece 40 and mold closure 30 or maintaining a desired pressure at the surface of workpiece 40 in spite of thermal expansion during molding, can be obtained.

Yet alternatively, or additionally, the uniform structural integrity of the surface of workpiece 40 opposing mold closure 30 is maintained during the whole process such that any touch upon workpiece 40 by touch sensor(s) 12 is negligible to the final formed workpiece, at step 64. For example, in the embodiment of FIG. 6, this may be achieved by conventional means for maintaining a uniform thickness to the touch sensor assembly 16 in an environment ranging from mere atmospheric pressure to the high pressures experienced during compression molding. In the embodiment of FIG. 5, for example, mold closure 30 may have recesses (not shown) to receive the contact sensor pads 14 and otherwise may also maintain a uniform thickness to touch sensor assembly 16 similar to the embodiment of FIG. 6.

After the compression molding step is completed, final formed workpiece is removed from mold 26, at step 66. Then, preferably, touch sensor(s) 12 or touch sensor assembly 16, is separated from at least workpiece 40, at step 68. Alternatively, or additionally, contact sensor(s) 14 may also be separated from mold closure 30. In either case, preferably touch sensor(s) 12, or the touch sensor assembly 16, is reusable from one workpiece to another, and most preferably from one mold 26 to another.

This invention may have an endless variety of uses for all kinds of compression molded devices. Presently though, excellent results are contemplated when the invention is used to manufacture aircraft engine fan blades made of laminated sheets of epoxy resin reinforced by unidirectional carbon fiber tows.

As various possible embodiments may be made in the above invention for use for different purposes and as various changes might be made in the embodiments above set forth, it is understood that all matters here set forth or shown in the accompanying drawings are to be interpreted as illustrative and not in a limiting sense.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. Apparatus for sensing touch between a compression mold and a workpiece located in said compression mold including a mold cavity and a mold closure movable relative to said workpiece, comprising:

at least one compliant sensor sheet positionable to signal touch between said mold closure and said workpiece; wherein at least one touch sensor generates a signal that indicates when said mold closure contacts a portion of said workpiece and controls the mold closure based on said signal to contact said workpiece with said remaining portions of said mold closure.

2. The apparatus of claim 1, wherein said at least one touch sensor comprises a plurality of touch sensors disposed to signal touch between said mold closure and said workpiece at a plurality of different points across a surface of said workpiece.

3. The apparatus of claim 2, wherein said mold closure tilts relative to said workpiece and further comprises a compression mold control system that controls a mold closure rate or a tilt of said mold closure based on said signal generated by said at least one touch sensor.

4. The apparatus of claim 3, wherein said at least one touch sensor further comprises a pressure sensor and in which a second signal further indicates a surface pressure between said workpiece and said mold closure.

5. The apparatus of claim 1, wherein said at least one touch sensor comprises a touch sensor pad positionable between said mold closure and said workpiece.

6. The apparatus of claim 1, wherein said at least one touch sensor comprises a touch sensor assembly including a compliant sheet and said touch sensor pad.

7. The apparatus of claim 6, wherein said compliant sheet comprises a non-conductive deformable member from said group consisting of resin, thermoplastic resin and silicone rubber.

8. The apparatus of claim 1, wherein said at least one touch sensor is reusable from one workpiece to another.

\* \* \* \* \*